US011176323B2

(12) United States Patent
Bull et al.

(10) Patent No.: US 11,176,323 B2
(45) Date of Patent: Nov. 16, 2021

(54) NATURAL LANGUAGE PROCESSING USING AN ONTOLOGY-BASED CONCEPT EMBEDDING MODEL

(71) Applicant: International Business Machines Corporation, Armonk, NY (US)

(72) Inventors: Brendan Bull, Durham, NC (US); Paul L. Felt, Springville, UT (US); Andrew G. Hicks, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 16/545,608

(22) Filed: Aug. 20, 2019

(65) Prior Publication Data

US 2021/0056168 A1 Feb. 25, 2021

(51) Int. Cl.
*G06F 40/237* (2020.01)
*G06F 40/284* (2020.01)
(Continued)

(52) U.S. Cl.
CPC ........ *G06F 40/284* (2020.01); *G06F 16/3347* (2019.01); *G06F 40/211* (2020.01); *G06F 40/30* (2020.01)

(58) Field of Classification Search
CPC .... G06F 40/237; G06F 40/242; G06F 40/247; G06F 40/279; G06F 40/284; G06F 40/30; G06N 20/00
(Continued)

(56) References Cited

U.S. PATENT DOCUMENTS

| 9,477,752 B1 | 10/2016 | Romano |
| 9,672,814 B2 | 6/2017 | Cao et al. |

(Continued)

FOREIGN PATENT DOCUMENTS

| CN | 105260488 A | 1/2016 |
| CN | 108717574 A | 10/2018 |
| CN | 110134943 A | 8/2019 |

OTHER PUBLICATIONS

He et al., "An Approach to Automatically Constructing Domain Ontology", Proceedings of the 20th Pacific Asia Conference on Language, Information and Computation, Nov. 2006, pp. 150 to 157. (Year: 2006).*

(Continued)

*Primary Examiner* — Martin Lerner
(74) *Attorney, Agent, or Firm* — Rob Bean; Edell, Shapiro & Finnan, LLC

(57) ABSTRACT

A computer system generates a vector space model based on an ontology of concepts. One or more training examples are extracted for one or more concepts of a hierarchical ontology, wherein the one or more training examples for the one or more concepts are based on neighboring concepts in the hierarchical ontology. A plurality of vectors, each including one or more features, are initialized, wherein each vector corresponds to a concept of the one or more concepts. A vector space model is generated by iteratively modifying one or more vectors of the plurality of vectors to optimize a loss function. Natural language processing is performed using the vector space model. Embodiments of the present invention further include a method and program product for generating a vector space model in substantially the same manner described above.

24 Claims, 5 Drawing Sheets

(51) Int. Cl.
*G06F 40/30* (2020.01)
*G06F 16/33* (2019.01)
*G06F 40/211* (2020.01)

(58) Field of Classification Search
USPC ................. 704/1, 9, 10; 706/19, 20, 55
See application file for complete search history.

(56) References Cited

U.S. PATENT DOCUMENTS

| | | | |
|---|---|---|---|
| 10,055,686 B2* | 8/2018 | Huang | G06F 40/40 |
| 10,963,501 B1* | 3/2021 | Ramachandrappa | G06F 16/35 |
| 2008/0319973 A1* | 12/2008 | Thambiratnam | G06F 16/313 |
| 2009/0157382 A1* | 6/2009 | Bar | G06F 40/284 704/8 |
| 2012/0330647 A1 | 12/2012 | Burges et al. | |
| 2015/0066711 A1* | 3/2015 | Chua | G06F 40/30 705/28 |
| 2015/0127323 A1* | 5/2015 | Jacquet | G06F 40/247 704/9 |
| 2017/0286835 A1* | 10/2017 | Ho | G06F 40/30 |
| 2017/0337268 A1 | 11/2017 | Ait-Mokhtar et al. | |
| 2018/0232443 A1* | 8/2018 | Delgo | G06F 40/295 |
| 2019/0057774 A1 | 2/2019 | Velez et al. | |
| 2019/0130282 A1* | 5/2019 | Quirk | G06F 40/295 |
| 2019/0197116 A1* | 6/2019 | Vlad | G06F 40/51 |
| 2020/0050657 A1* | 2/2020 | Uchide | G06F 40/186 |
| 2020/0117856 A1* | 4/2020 | Kumar Karn | G06F 40/295 |
| 2020/0210520 A1* | 7/2020 | Akyamac | G06F 40/174 |
| 2020/0303072 A1* | 9/2020 | Drokin | G06F 17/00 |
| 2020/0342055 A1* | 10/2020 | Patra | G06F 40/295 |
| 2021/0182328 A1* | 6/2021 | Rollings | G06F 40/295 |

OTHER PUBLICATIONS

A. Neelakantan, et al., "Compositional Vector Space Models for Knowledge Base Completion", Proceedings of the 53rd Annual Meeting of the Association for Computational Linguistics and the 7th International Joint Conference on Natural Langugage Processing, Beijing, China, Jul. 26-31, 2015, 11 pages.

Y. Choi, et al., "Learning Low-Dimensional Representations of Medical Concepts", AMIA Joint Summits on Translational Science, PMC5001761, Jul. 20, 2016, 10 pages.

S. Dubois, et al., "Efficient Representations of Clinical Text", arXiv:1705.07025v3 [stat.ML], Aug. 20, 2018, 20 pages.

A. Garcia-Durán, et al., "Combining Two and Three-Way Embeddings Models for Link Prediction in Knowledge Bases", Journal of Artificial Intelligence Research 1 (2015) 1-15, Sep. 1991, 26 pages.

M. Alshahrani, et al., "Neuro-symbolic representation learning on biological knowledge graphs", Original Paper, Bioinformatics, 33(17), 2017, 2723-2730, doi: 10.1093/bioinformatics/btx275, Apr. 25, 2017, 8 pages.

M. Alsuhaibani, et al., "Jointly learning word embeddings using a corpus and a knowledge base", Research Article, PLoS ONE 13(3): e0193094, https://doi.org/10.1371/journal.pone.0193094, Mar. 12, 2018, 26 pages.

International Search Report and Written Opinion in corresponding International Application No. PCT/IB2020/057621, dated Nov. 30, 2020, 10 pages.

* cited by examiner

NATURAL LANGUAGE PROCESSING USING AN ONTOLOGY-BASED CONCEPT EMBEDDING MODEL

BACKGROUND

1. Technical Field

Present invention embodiments relate to natural language processing, and more specifically, to natural language processing techniques that use an ontology-based concept embedding model.

2. Discussion of the Related Art

In the field of natural language processing, word embedding refers to the process of mapping words or phrases to vectors of real numbers. Conventional word embedding models are trained by analyzing word or phrase usage in a large corpus to create dense vector representations of words that are useful for downstream natural language processing tasks. However, words that are rare or ambiguous may not be accurately represented in word embedding models.

SUMMARY

According to one embodiment of the present invention, a computer system generates a vector space model based on an ontology of concepts. One or more training examples are extracted for one or more concepts of a hierarchical ontology, wherein the one or more training examples for the one or more concepts are based on neighboring concepts in the hierarchical ontology. A plurality of vectors, each including one or more features, are initialized, wherein each vector corresponds to a concept of the one or more concepts. A vector space model is generated by iteratively modifying one or more vectors of the plurality of vectors to optimize a loss function. Natural language processing is performed using the vector space model.

Various other embodiments of the present invention will now be discussed. In some embodiments, the vector space model is a continuous bag of words model. By using a continuous bag of words model, target concepts and/or words can be predicted based on source (e.g., surrounding) context concepts and/or words. In some embodiments, the one or more training examples for the one or more concepts include one or more positive training examples, and one or more negative training examples, and the loss function is optimized by modifying one or more vectors of the plurality of vectors to minimize the loss function for positive training examples and to maximize the loss function for negative training examples. By optimizing the loss function with both positive and negative examples, a vector space model can be generated in which vectors of related concepts are close to each other while also being distant from unrelated concepts. In some embodiments, an output of the loss function for each concept is proportional to a first cosine similarity of a vector for the concept and a first mean vector, wherein the first mean vector is a mean of one or more vectors for parent concepts of the concept and one or more vectors for child concepts of the concept. The context of the concept is accurately captured by creating a mean vector that is based on parent and child concepts of a concept. In further embodiments, non-ambiguous text representations of a concept are identified, and the output of the loss function is further proportional to a second cosine similarity between the vector for the concept and a second mean vector that is a mean of one or more word vectors based on the one or more non-ambiguous text representations. By using non-ambiguous text representations to provide word vectors in addition to the concept vectors, lexical pressure may be added to the vector space model. In some embodiments, the non-ambiguous text representations are identified in one or more lexical corpora. Lexical corpora can be used to introduce samples of words as the words occur naturally in language. In some embodiments, the vector space model can be used to identify words that are related to a queried concept, or concepts that are related to a queried word, based on the cosine similarities of their vectors. The vector space model may be used to identify words that are related to concepts, and concepts that are related to words, thereby enabling concept embeddings to be utilized in combination with word embeddings. Embodiments of the present invention further include a method and program product for generating a vector space model in substantially the same manner described above.

BRIEF DESCRIPTION OF THE DRAWINGS

Generally, like reference numerals in the various figures are utilized to designate like components.

DETAILED DESCRIPTION

Figure 1:
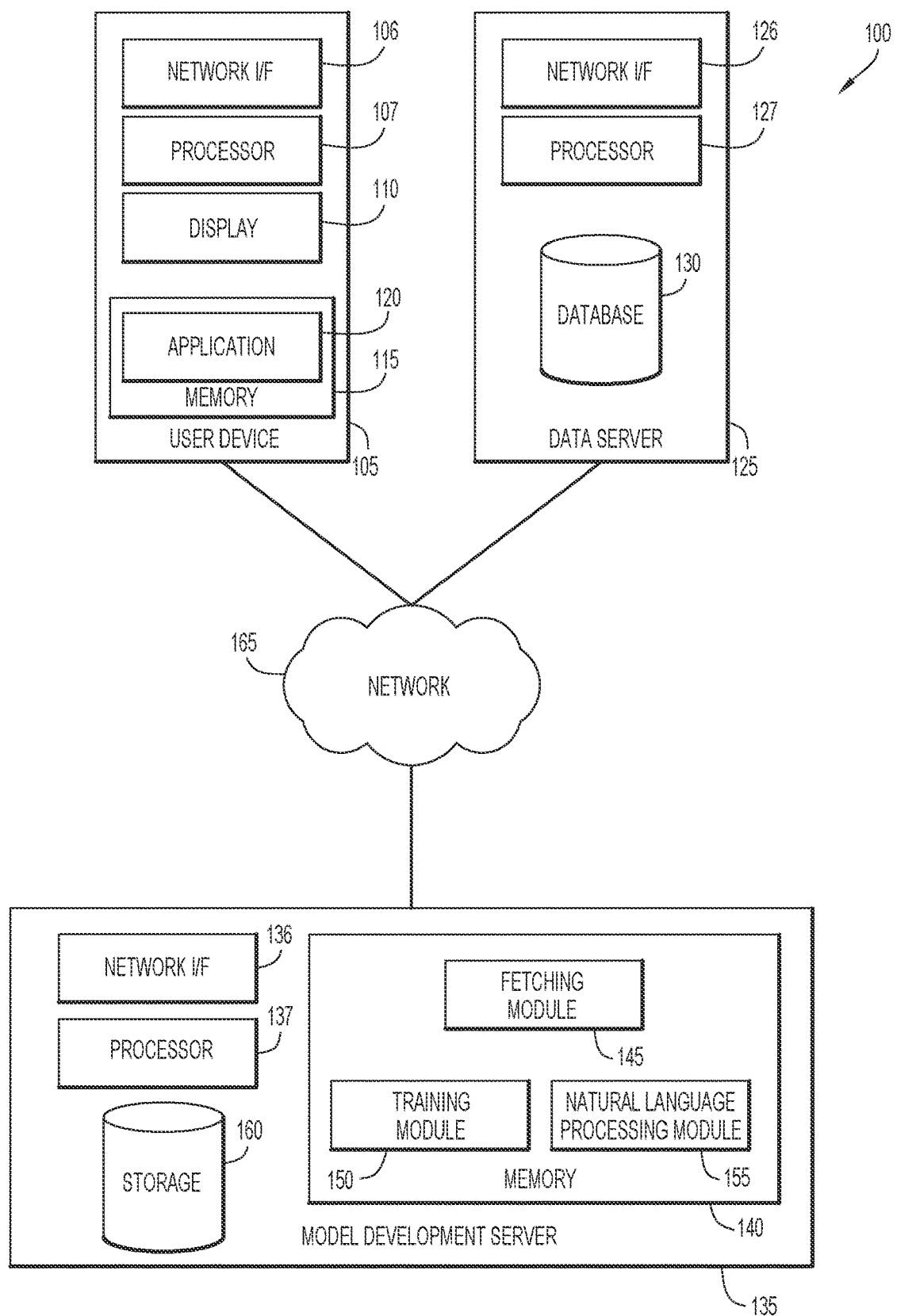
FIG. 1 is a block diagram depicting a computing environment for generating concept embeddings in accordance with an embodiment of the present invention.

Present invention embodiments relate to natural language processing, and more specifically, to natural language processing techniques that use an ontology-based concept embedding model. An ontology is a hierarchical representation of concepts according to the categories, properties, and relations between the concepts. Ontologies may be domain-specific or may span multiple domains of study. For example, the Unified Medical Language System (UMLS®) is a hierarchical ontology that integrates health and biomedical vocabularies and standards into a semantic network that groups concepts according to their categories (i.e., semantic types) and their relationships (i.e., semantic relations).

Natural language processing techniques may rely on a continuous bag of words model, which is a vector space model in which words or phrases are represented as vectors. Each vector may represent the embedding of a word (or phrase), which includes the context in which the word appears in a corpus of sample text, the semantic and syntactical similarity between the word and other words, and the relation of the word to other words in the corpus.

In contrast to corpus-based word embeddings, present invention embodiments generate a continuous bag of words model of concept embeddings based on a hierarchical ontology of concepts. This ontology-based model is able to address several shortcomings of corpus-based models. In particular, corpus-based models may not accurately represent rare words, since the quality of a word embedding is a function of the word's appearance in a corpus. Ontologies, however, may include representations of words that are rarely seen in literature; for example, a rare gene may have few, if any, representations in medical publications, but the gene may be represented in an ontology with reference to parent or children concepts.

Furthermore, present invention embodiments more accurately represent ambiguous words or phrases. Polysemous words can have multiple disparate meanings in a corpus, leading to inaccuracies in word embedding models. However, an ontology-based model may avoid such ambiguities, as concepts are embedded with reference to their parent and children concepts.

Thus, present invention embodiments utilize an ontology of concepts to produce a model of concept embeddings. Lexical pressure may be added to the model by using a corpus to include well-embedded and unambiguous words for concepts when possible, thereby encouraging concepts to be embedded in a space that aligns with an existing word embedding space. By combining ontological information with word embedding information, new concept embeddings may be developed to create a model that supports downstream natural language processing tasks in a manner that increases speed, accuracy, and recall.

According to one embodiment of the present invention, a computer system generates a vector space model based on an ontology of concepts. One or more training examples are extracted for one or more concepts of a hierarchical ontology, wherein the one or more training examples for the one or more concepts are based on neighboring concepts in the hierarchical ontology. A plurality of vectors, each including one or more features, are initialized, wherein each vector corresponds to a concept of the one or more concepts. A vector space model is generated by iteratively modifying one or more vectors of the plurality of vectors to optimize a loss function. Natural language processing is performed using the vector space model.

Various other embodiments of the present invention will now be discussed. In some embodiments, the vector space model is a continuous bag of words model. By using a continuous bag of words model, target concepts and/or words can be predicted based on source (e.g., surrounding) context concepts and/or words. In some embodiments, the one or more training examples for the one or more concepts include one or more positive training examples, and one or more negative training examples, and the loss function is optimized by modifying one or more vectors of the plurality of vectors to minimize the loss function for positive training examples and to maximize the loss function for negative training examples. By optimizing the loss function with both positive and negative examples, a vector space model can be generated in which vectors of related concepts are close to each other while also being distant from unrelated concepts. In some embodiments, an output of the loss function for each concept is proportional to a first cosine similarity of a vector for the concept and a first mean vector, wherein the first mean vector is a mean of one or more vectors for parent concepts of the concept and one or more vectors for child concepts of the concept. The context of the concept is accurately captured by creating a mean vector that is based on parent and child concepts of a concept. In further embodiments, non-ambiguous text representations of a concept are identified, and the output of the loss function is further proportional to a second cosine similarity between the vector for the concept and a second mean vector that is a mean of one or more word vectors based on the one or more non-ambiguous text representations. By using non-ambiguous text representations to provide word vectors in addition to the concept vectors, lexical pressure may be added to the vector space model. In some embodiments, the non-ambiguous text representations are identified in one or more lexical corpora. Lexical corpora can be used to introduce samples of words as the words occur naturally in language. In some embodiments, the vector space model can be used to identify words that are related to a queried concept, or concepts that are related to a queried word, based on the cosine similarities of their vectors. The vector space model may be used to identify words that are related to concepts, and concepts that are related to words, thereby enabling concept embeddings to be utilized in combination with word embeddings. Embodiments of the present invention further include a method and program product for generating a vector space model in substantially the same manner described above.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but does not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Present invention embodiments will now be described in detail with reference to the Figures. FIG. 1 is a block diagram depicting a computing environment 100 for generating concept embeddings in accordance with an embodiment of the present invention. As depicted, computing environment 100 includes a user device 105, a data server 125, a model development server 135, and a network 165. It is to be understood that the functional division among components of computing environment 100 have been chosen for purposes of explaining present invention embodiments and is not to be construed as a limiting example.

User device 105 includes a network interface (I/F) 106, at least one processor 107, a display 110, and memory 115. Memory 115 may include application 120. User device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 106 enables components of user device 105 to send and receive data over a network, such as network 165. User device 105 may include internal and external hardware components, as depicted and described in further detail with respect to FIG. 4.

Display 110 may include any electronic device capable of presenting information in a visual form. For example, display 110 may be a liquid crystal display (LCD), a cathode ray tube (CRT) display, a light-emitting diode (LED) display, an electronic ink display, and the like. Information relating to generating concept embeddings to support natural language processing tasks may be displayed to a user of user device 105 via display 110.

Application 120 may include one or more modules or units to perform various functions of present invention embodiments described below. Application 120 may be implemented by any combination of any quantity of software and/or hardware modules or units, and may reside within memory 115 of user device 105 for execution by a processor, such as processor 107.

Application 120 may enable a user of user device 105 to manage the generation of concept embeddings and development of a vector space model to support natural language processing tasks. For example, a user of user device 105 may provide instructions, via application 120, for model development server 135 and its modules to generate concept embeddings for one or more vector space models. A user of user device 105 may select one or more corpora and/or hierarchical ontologies to be processed by model development server 135. Additionally, a user may interact with application 120 in order to provide instructions to model development server 135 to perform one or more natural language processing tasks using generated vector space models. The natural language processing tasks may include any conventional or other task, such as syntactic parsing or sentiment analysis.

Data server 125 includes a network interface 126, at least one processor 127, and at least one database 130. In various embodiments of the present invention, data server 125 may include a laptop computer, a tablet computer, a netbook computer, a personal computer (PC), a desktop computer, a personal digital assistant (PDA), a smart phone, or any programmable electronic device capable of executing computer readable program instructions. Network interface 126 enables components of data server 125 to send and receive data over a network, such as network 165. In general, data server 125 may store data relating to one or more corpora and/or one or more hierarchical ontologies.

Database 130 may include any non-volatile storage media known in the art. For example, database 130 can be implemented with a tape library, optical library, one or more independent hard disk drives, or multiple hard disk drives in a redundant array of independent disks (RAID). Similarly, data on database 130 may conform to any suitable storage architecture known in the art, such as a file, a relational database, an object-oriented database, and/or one or more tables. In some embodiments, database 130 stores data relating to one or more corpora that are suitable for the development of vector space models. The corpora may include any volume of text corresponding to any domain or domains of study; in some embodiments, database 130 may store a corpus of health and biomedical text. Additionally or alternatively, database 130 may store one or more hierarchical ontologies that include concepts and relations between concepts. A hierarchical ontology may include any known or other ontology, such as the UMLS®, Gene Ontology (GO), or Systematized Nomenclature of Medicine-Clinical Terms (SNOMED-CT).

Model development server 135 includes a network interface 136, at least one processor 137, memory 140, and storage 160. Memory 140 includes a fetching module 145, a training module 150, and a natural language processing module 155. In various embodiments of the present invention, model development server 135 may include a laptop computer, a tablet computer, a netbook computer, a personal computer (PC), a desktop computer, a personal digital assistant (PDA), a smart phone, or any programmable electronic device capable of executing computer readable program instructions. Network interface 136 enables components of model development server 135 to send and receive data over a network, such as network 165. In general, model development server 135 and its modules may produce concept and word embeddings to generate vector space models, which model development server 135 may utilize to perform natural language processing tasks. Model development server 135 may include internal and external hardware components, as depicted and described in further detail with respect to FIG. 4.

Fetching module 145, training module 150, and natural language processing module 155 may include one or more modules or units to perform various functions of present invention embodiments described below. Fetching module 145, training module 150, and natural language processing module 155 may be implemented by any combination of any quantity of software and/or hardware modules or units, and may reside within memory 140 of model development server 135 for execution by a processor, such as processor 137.

Fetching module 145 may obtain data to support the development of vector space models in accordance with present embodiments, including one or more corpora and/or one or more ontologies. In some embodiments, fetching module 145 receives data relating to a corpus or an ontology from database 130 of data server 125, which may then be stored in storage 160. Fetching module 145 may receive instructions from application 120 of user device 105 to obtain data, including one or more network-accessible locations from which to obtain the data. Fetching module 145 may perform various conventional or other pre-processing tasks on obtained data, including tokenization and segmentation, normalization, stemming, lemmatization, noise removal, and the like.

Training module 150 may process an ontology of concepts alone or in combination with data obtained from lexical corpora to generate concept embeddings for a vector space model. In particular, training module 150 extracts training examples for a concept from neighboring context windows. Each context window may include other concepts that are linked to a selected concept according to the hierarchy of the ontology. For example, training windows for a concept may include one or more parent concepts, one or more child concepts, one or more grandchild concepts, etc. Training module 150 may generate a vector for each concept in an ontology, and train concept embeddings using the vectors.

Training module 150 may perform training on the set of vectors by iteratively adjusting vectors to optimize a loss function. The loss function may calculate a cosine similarity between two vectors: a vector representing a particular concept, and another vector that represents a context window for the concept. The vector representing a context window for a concept may itself be a mean of vectors associated with concepts in the selected concept window. For example, vectors corresponding to a focus concept's parent and/or children concepts (or grandparent, grandchild, etc.) may be averaged to produce a single vector, which is compared to a vector for the focus concept by calculating the cosine similarity between the two. In an embodiment, the loss function may be represented mathematically according to the relation:

$$\text{Loss(concept\_focus)} \propto \cos(\text{concept\_focus}, \text{mean}(\text{concepts\_parents\&children}))$$

wherein the output value of the loss function (e.g., "Loss") for a selected concept (e.g., "concept_focus") is directly proportional to the cosine similarity between a vector for the focus concept (e.g., "concept_focus") and a vector that is a mean of vectors for parents and/or children concepts of the focus concept (e.g., "mean(concepts_parents&children)"). The mean vector may be a mean of vectors corresponding to any concepts in a neighboring context window of the focus concept, and may include any combination of parent vectors, children vectors, grandparent vectors, grandchildren vectors, and the like. Proportionality of the loss function to the cosine similarity value may include a multiple of the cosine similarity value, such as 1.5 times the cosine similarity value, three times the cosine similarity value, 0.8 times the cosine similarity value, and the like.

Training module 150 may randomly initialize values for one or more features of each vector. A vector may include a plurality of dimensions, each of which represent a feature. In some embodiments, vectors are one-hot vectors in which each dimension has a specific meaning; in other embodiments, vectors are dense vectors in which the value for each dimension (and thus feature) is induced from data to capture word and/or concept embeddings in a corpus and/or ontology. The loss function may be optimized by iteratively adjusting the values for each vector in order to minimize the output value of the loss function when a vector is compared to positive training examples, and to maximize the output value for the loss function when a vector is compared to negative training examples. Positive training examples may represent concepts that are related to a focus concept, and negative training examples may represent concepts that are unrelated to a focus concept. In some embodiments, training module 150 generates positive training examples by selecting vectors that represent parents and/or children of a focus concept, and calculating a mean of the selected vectors. Training module 150 may generate negative training examples by selecting vectors of concepts that are unrelated (e.g., according to the hierarchical ontology) to the focus concept, and similarly calculating a mean of the selected vectors.

A positive training example may be based on a portion of an ontology. For example, if an ontology includes a concept of "phospholipids" that has a parent concept of "lipids" and child concept of "phosphatidylcholine," then training module 150 may generate a positive training example by calculating the mean of three vectors: a vector representing the concept of phospholipids, a vector representing the concept of lipids, and a vector representing the concept of phosphatidylcholine. A negative training example may be produced by selecting concepts in a window and substituting one or more of the concepts with an unrelated concept. The unrelated concept may be chosen by randomly selecting a concept that is not already included in the context window. For example, "canines" may be substituted with "phospholipids" to form a negative training example of lipids/canines/phosphatidylcholine. As the concept of canines does not logically fit in an ontological position between phospholipids and phosphatidylcholine, this example is considered a poor representation of the relatedness of these concepts, and is thus useful as a negative training example.

Training module 150 may iteratively adjust the values of the set of vectors representing concepts in an ontology until a desired level of convergence is attained. In some embodiments, training module 150 applies lexical pressure by combining concept embedding information with word embedding information when a surface form of a concept has non-ambiguous, well-embedded text representations (e.g., in a corpus). Surface forms for a concept may be identified in an ontology, and may include any terms for the concept, including synonyms and terms from different vocabularies. Training module 150 may identify non-ambiguous, well embedded text representations by determining that a surface form meets certain criteria. One criterion may include a term appearing in a document or corpus of documents a threshold number of times, such as thirty times. Surface forms may be excluded from consideration if they occur in multiple incompatible concepts, such as concepts that have different semantic types. For example, if a surface form is linked to a concept belonging to the semantic type "eukaryotes" and is also linked to another concept belonging to the semantic type "educational activity," this surface form would be excluded as being potentially ambiguous. Additionally or alternatively, training module 150 may exclude surface forms that are short acronyms (e.g., below a threshold number of characters).

When training module 150 has identified a non-ambiguous, well-embedded text representation of a surface form for a concept, training module 150 may utilize a loss function to apply lexical pressure to the concept's vector during training. In an embodiment, the loss function may be represented mathematically according to the relation:

$$\text{Loss(concept\_focus)} \propto \cos(\text{concept\_focus}, \text{mean}(\text{concepts\_parents\&children})) + \cos(\text{concept\_focus}, \text{mean}(\text{words\_concept}))$$

wherein the loss function is directly proportional to both the cosine similarity of a concept's vector and vectors of neighboring concepts as well as the cosine similarity of the concept's vector and a mean of word vectors that correspond to other words (e.g., "mean(words_concept)") that appear in a same context as the focus word in a corpus. Proportionality of the loss function to the cosine similarity value may include a multiple of the cosine similarity value, such as 1.5 times the cosine similarity value, three times the cosine similarity value, 0.8 times the cosine similarity value, and the like. Thus, optimizing the loss function may encourage concepts to be embedded in a space that aligns with an existing word embedding space. Training module 150 may output a vector space model that combines concept vectors and word vectors, providing the ability to look up words around a concept as well as concepts around a word. In particular, the vector space model may be used to identify words that are related to a concept by identifying any word vectors that are closest to the concept vector in terms of cosine similarity. Similarly, the vector space model can be used to identify concepts that are related to a word by identifying concept vectors that are closest to the word vector using a cosine similarity metric. For example, the vector space model may be provided with a query of a particular concept to return results that identify the top five closest words based on the cosine similarities of their corresponding vectors.

Natural language processing module 155 may perform known or other natural language processing tasks using vector space models that are generated by training module 150. For example, natural language processing module 155 may utilize a vector space model to perform tasks such as topic recognition, sentiment analysis, question answering, machine translation, word sense disambiguation, and the like. A user of user device 105 may provide instructions to natural language processing module 155 via application 120 in order to perform a particular natural language processing task and/or to select a particular vector space model to be used by a natural language processing task.

Storage 160 may include any non-volatile storage media known in the art. For example, storage 160 can be implemented with a tape library, optical library, one or more independent hard disk drives, or multiple hard disk drives in a redundant array of independent disks (RAID). Similarly, data in storage 160 may conform to any suitable storage architecture known in the art, such as a file, a relational database, an object-oriented database, and/or one or more tables. Storage 160 may store data relating to developing vector space models and/or performing natural language processing, including one or more lexical corpora, one or more ontologies of concepts, vector representations of concept embeddings and/or word embeddings, and the like.

Network 165 may include a local area network (LAN), a wide area network (WAN) such as the Internet, or a combination of the two, and includes wired, wireless, or fiber optic connections. In general, network 165 can be any combination of connections and protocols known in the art that will support communications between user device 105, data server 125, and/or model development server 135 via their respective network interfaces in accordance with embodiments of the present invention.

Figure 2A:
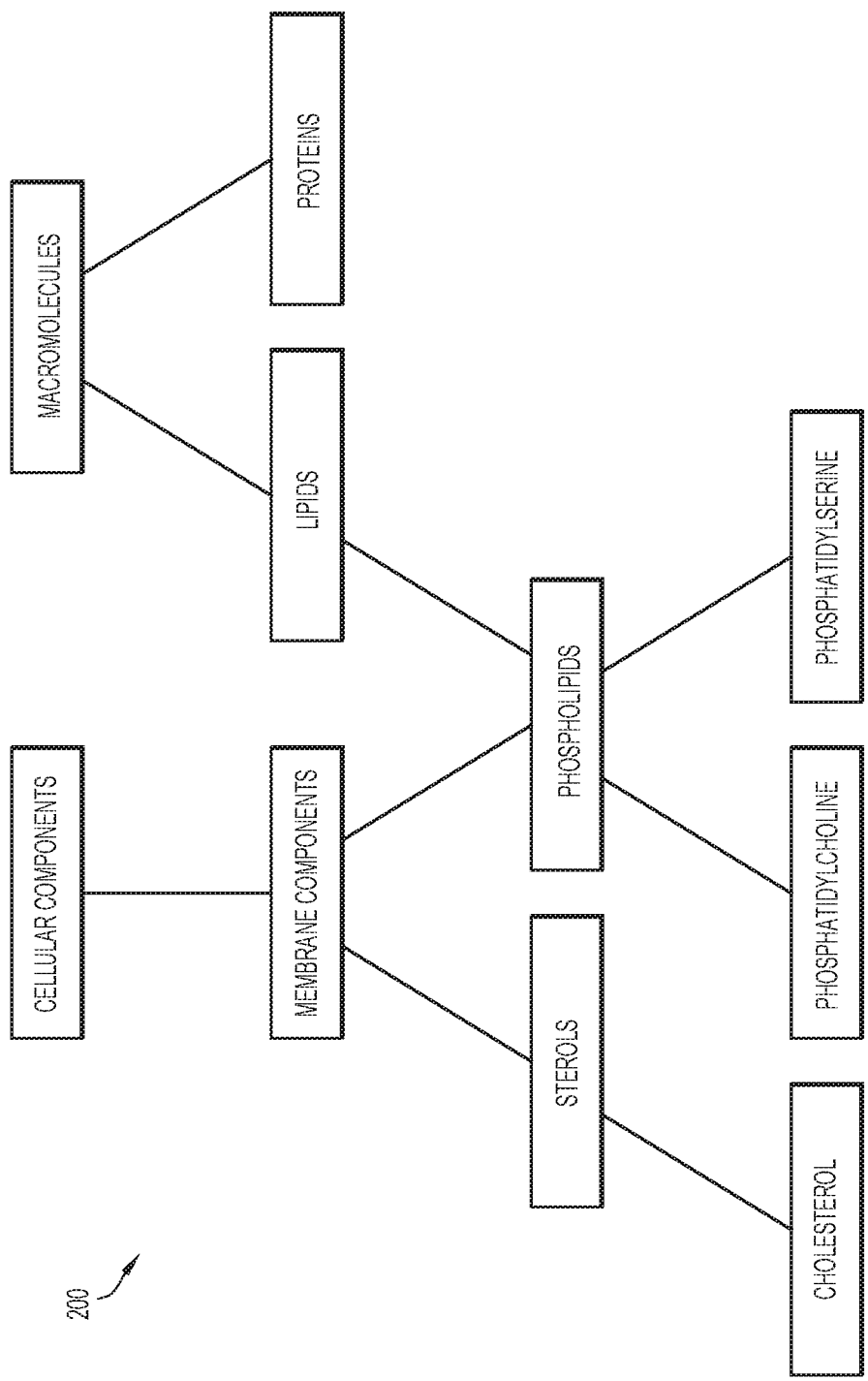
FIG. 2A is a block diagram depicting a portion of a hierarchical ontology in accordance with an embodiment of the present invention.

FIG. 2A is a block diagram depicting a portion of a hierarchical ontology 200 in accordance with an embodiment of the present invention. As depicted, the portion of a hierarchical ontology 200 includes concepts that are linked to each other. Each link may indicate a relationship between two concepts, and each concept may be placed at a particular hierarchical level to establish parent and child concepts for a selected concept. For example, the concept "phospholipids" has two child concepts "phosphatidylcholine" and "phosphatidylserine," and has two parent concepts, "membrane components" and "lipids." A hierarchical ontology may have any number of concepts that form any number of hierarchical levels.

Figure 2B:
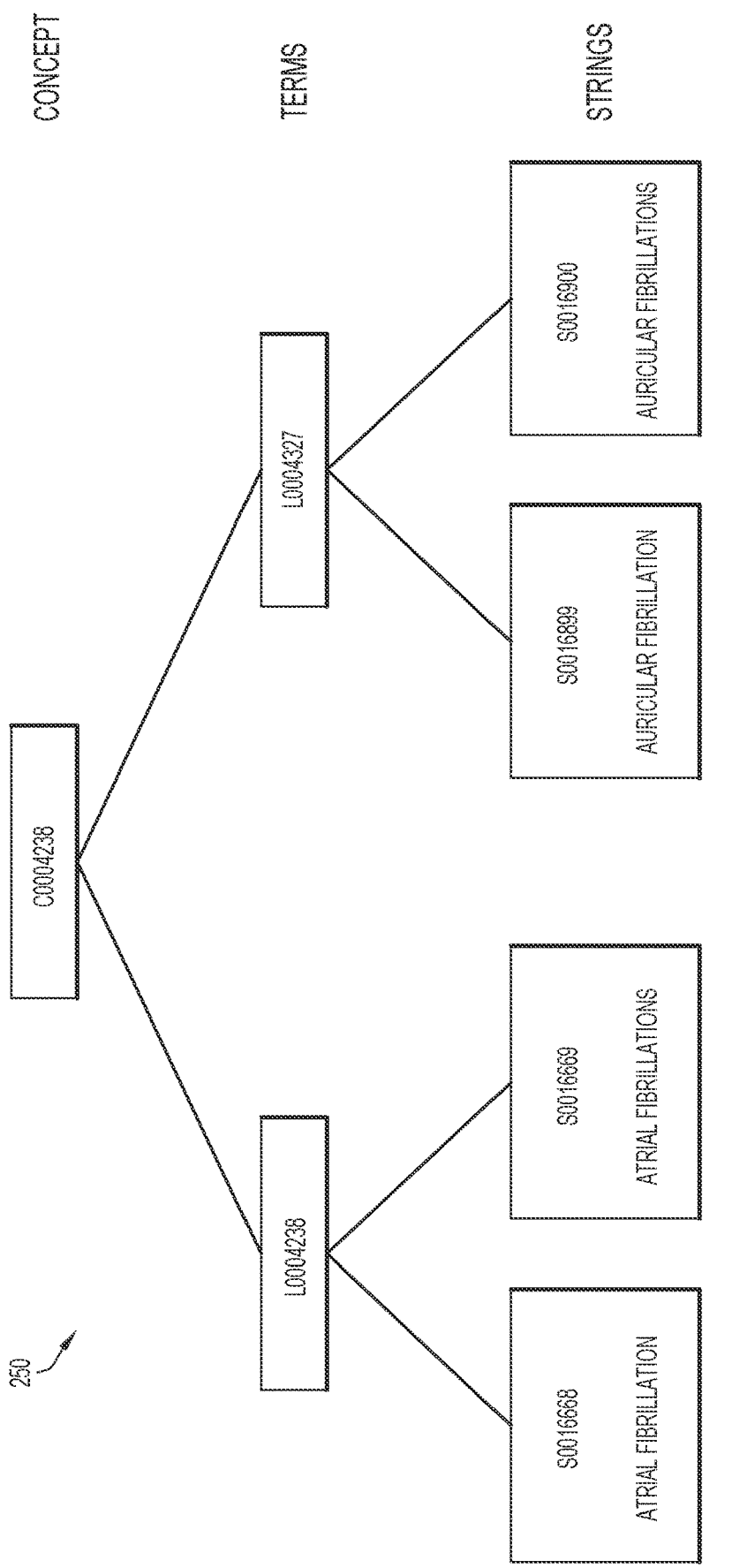
FIG. 2B is a block diagram depicting a portion of a concept hierarchy in accordance with an embodiment of the present invention.

FIG. 2B is a block diagram depicting a portion of a concept hierarchy 250 in accordance with an embodiment of the present invention. As depicted, the portion of a concept hierarchy includes a concept, terms associated with the concept, and strings associated with the terms.

Each concept in an ontology may be assigned a unique identifier, and similar words or phrases for the concept may be grouped according to terms that are also assigned unique identifiers. For example, the concept "C0004238" may refer to a specific form of fibrillation that occurs in the atrium of a heart. Strings for this concept include atrial fibrillation and atrial fibrillations, which are assigned to the term "L0004238," and auricular fibrillation and auricular fibrillations, which are assigned to the term "L0004327." Each string may thus represent a particular surface form for a concept.

Figure 3:
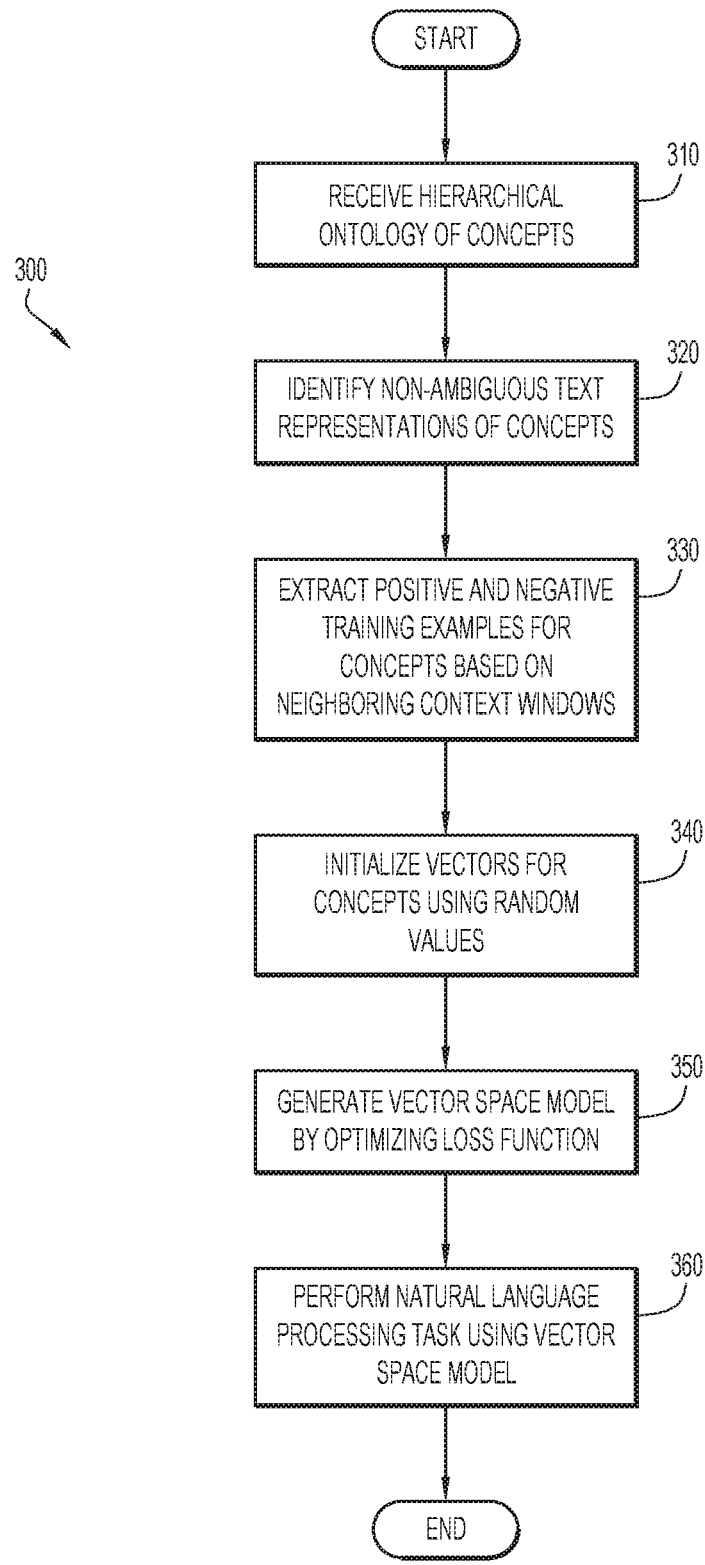
FIG. 3 is a flow chart depicting a method of performing natural language processing in accordance with an embodiment of the present invention.

FIG. 3 is a flow chart depicting a method 300 of performing natural language processing in accordance with an embodiment of the present invention.

A hierarchical ontology of concepts is received at operation 310. The ontology may be received by fetching module 145 from a database, such as database 130 of data server 125 or storage 160 of model development server 135. Information in an ontology may include concepts, hierarchical relationships between the concepts, and other data for concepts, such as surface forms for each concept and semantic types of concepts. Additionally, information pertaining to one or more lexical corpora may be retrieved at operation 310. Once fetching module 145 retrieves an ontology or a corpus, fetching module 145 may perform conventional or other pre-processing tasks.

Non-ambiguous text representations for concepts are identified at operation 320. Training module 150 may determine, for each concept, whether the concept has a surface form that is well-embedded and non-ambiguously represented in a corpus. Training module 150 may select a surface form to be used as text representations when the surface form surpasses a threshold level of representation in a corpus (e.g. greater than thirty appearances), when the surface form is not linked to multiple incompatible concepts (such as concepts having different semantic types), and/or when the surface form is not a short acronym (e.g., fewer than a threshold number of characters). Surface forms of a concept may be extracted from a concept hierarchy. For example, concept hierarchy 250 may provide surface forms of "atrial fibrillation" and "auricular fibrillation" for the selected concept having the identifier "C0004238."

Positive and negative training examples for a concept may be extracted based on neighboring context windows at operation 330. Positive and negative training examples may be generated by training module 150 by processing an ontology. Positive training examples for a selected concept may be extracted based on multiple concepts that are near the selected concept in an ontology, such as parent or child concepts of the selected concept. Negative training examples may be selected by substituting one or more random concepts into a context window, thus creating an example whose concepts are unlikely to be related to each other. For example, a positive training example may be extracted from hierarchical ontology 200 that includes a triplet of "lipids," "phospholipids," and "phosphatidylcholine." A negative training example may be extracted from hierarchical ontology 200 by substituting a random concept for one or more concepts in the ontology 200; for example, a negative training example may include "lipids," "canines," and "phosphatidylserine."

Vectors for the concepts are initialized using random values at operation 340. Training module 150 may create a multi-dimensional vector for each concept in an ontology and may initialize the dimensions of each vector with random values. In some embodiments, training module 150 also creates and initializes multi-dimensional vectors for each text representation of a concept that is identified in operation 320.

A vector space model is generated by optimizing a loss function over the training examples at operation 350. Training module 150 iteratively optimizes the loss function by adjusting vectors to maximize the output of the loss function for positive training examples and to minimize the output for negative training examples, as the loss function calculates a cosine similarity between a focus vector and another vector representing the training example. In particular, the loss function may be optimized by adjusting vectors using a gradient descent algorithm. A derivative of the loss function may be calculated with respect to each of the vectors that is adjusted; this derivative indicates whether a value of a dimension of a vector should be increased or decreased. A vector is adjusted in the correct direction (e.g., by increasing or decreasing the value of a dimension), and a next vector is selected for adjusting, thereby incrementally improving the loss each time.

Training module 150 may generate a vector that represents a training example by calculating the mean of two or more vectors corresponding to the concepts in the training example. When a text representation for a concept has been identified in operation 320, the loss function may also include a cosine similarity between the concept's vector and a mean of word vectors based on words that appear in the same contexts in which the text representation appears in lexical corpora. Once vectors have converged over multiple iterations, training module 150 may output a vector space model that is suitable for natural language processing tasks. In some embodiments, the vector space model is a continuous bag of words model.

A natural language processing task is performed using the vector space model at operation 360. Natural language processing module 155 may perform one or more conventional or other natural language processing tasks using the vector space model, including tasks such as disambiguation, topic recognition, sentiment analysis, question answering, machine translation, and the like.

Figure 4:
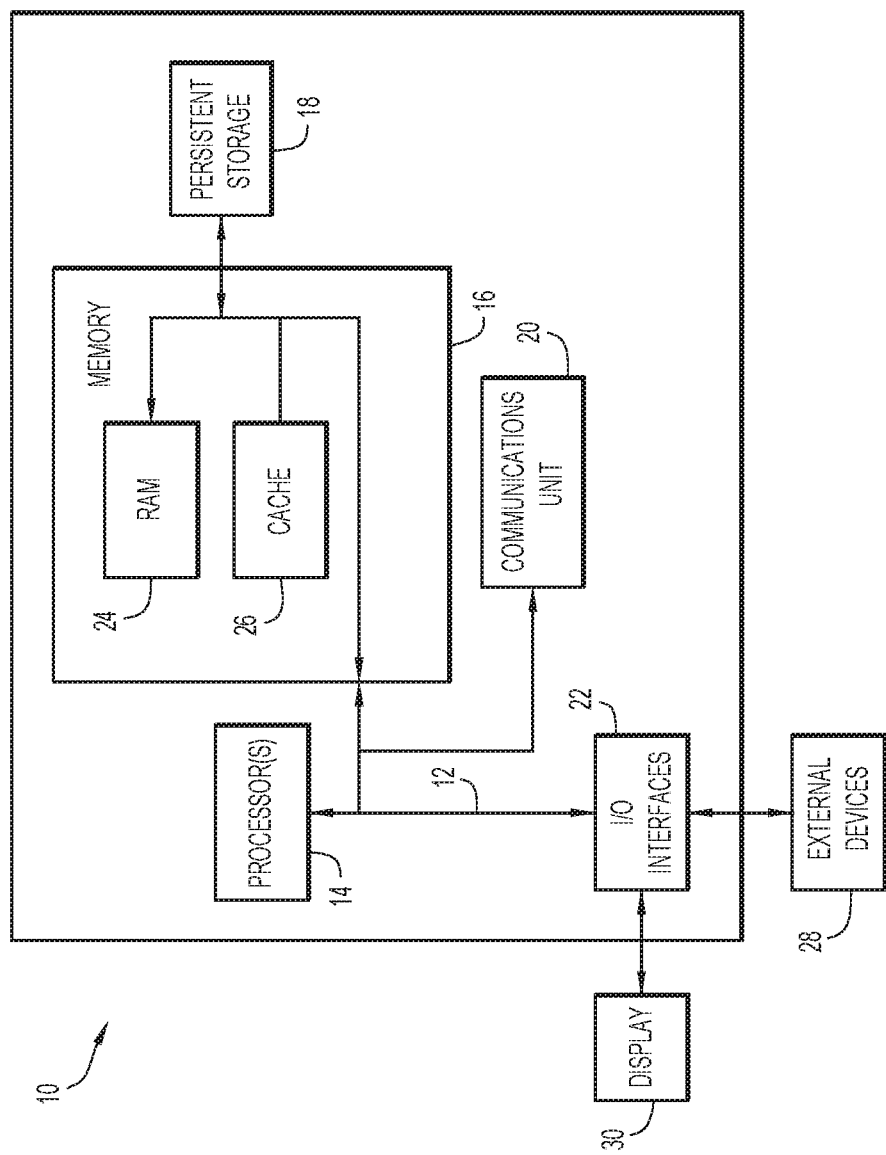
FIG. 4 is a block diagram depicting a computing device in accordance with an embodiment of the present invention.

FIG. 4 is a block diagram depicting components of a computer 10 suitable for executing the methods disclosed herein. Computer 10 may implement user devices 105, data server 125, and/or model development server 135 in accordance with embodiments of the present invention. It should be appreciated that FIG. 4 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to natural language processing using an ontology-based concept embedding model (e.g., ontology data, corpus data, vector space model data, etc.) may be stored within any conventional or other data structures (e.g., files, arrays, lists, stacks, queues, records, etc.) and may be stored in any desired storage unit (e.g., database, data or other repositories, queue, etc.). The data transmitted between user device 105, data server 125, and/or model development server 135 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to natural language processing using an ontology-based concept embedding model (e.g., ontology data, corpus data, vector space model data, etc.) may include any information provided to, or generated by, user device 105, data server 125, and/or model development server 135. Data relating to natural language processing using an ontology-based concept embedding model may include any desired format and arrangement, and may include any quantity of any types of fields of any size to store any desired data. The data relating to natural language processing using an ontology-based concept embedding model may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to natural language processing using an ontology-based concept embedding model), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of implementing embodiments for performing natural language processing using an ontology-based concept embedding model.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, application 120, fetching module 145, training module 150, natural language processing module 155, etc.). These systems may include any types of monitors and input devices (e.g., keyboard, mouse, voice recognition, etc.) to enter and/or view information.

It is to be understood that the software (e.g., browser software, communications software, server software, application 120, fetching module 145, training module 150, natural language processing module 155, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., browser software, communications software, server software, application 120, fetching module 145, training module 150, natural language processing module 155, etc.) may be available on a non-transitory computer usable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to natural language processing using an ontology-based concept embedding model). The database system may be implemented by any number of any conventional or other databases, data stores or storage structures (e.g., files, databases, data structures, data or other repositories, etc.) to store information (e.g., data relating to natural language processing using an ontology-based concept embedding model). The database system may be included within or coupled to the server and/or client systems. The database systems and/or storage structures may be remote from or local to the computer or other processing systems, and may store any desired data (e.g., data relating to natural language processing using an ontology-based concept embedding model).

The present invention embodiments may employ any number of any type of user interface (e.g., Graphical User Interface (GUI), command-line, prompt, etc.) for obtaining or providing information (e.g., data relating to natural language processing using an ontology-based concept embedding model), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any number of applications in the relevant fields, including, but not limited to, natural language processing, machine learning, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for natural language processing comprising:
    extracting one or more training examples for one or more concepts of a hierarchical ontology, wherein the one or more training examples for the one or more concepts are based on neighboring concepts in the hierarchical ontology;
    initializing a plurality of vectors each including one or more features, wherein each vector corresponds to a concept of the one or more concepts;
    generating a vector space model by iteratively modifying one or more vectors of the plurality of vectors to optimize a loss function, wherein an output of the loss function for each concept is proportional to a first cosine similarity of a vector for the concept and a first mean vector, wherein the first mean vector is a mean of a plurality of vectors for child concepts of the concept; and
    performing natural language processing using the vector space model.

2. The computer-implemented method of claim 1, wherein the vector space model comprises a continuous bag of words model.

3. The computer-implemented method of claim 1, wherein the one or more training examples for the one or more concepts include one or more positive training examples and one or more negative training examples, and wherein optimizing the loss function comprises:
    modifying one or more vectors of the plurality of vectors to minimize the loss function for each of the one or more positive training examples; and
    modifying one or more vectors of the plurality of vectors to maximize the loss function for each of the one or more negative training examples.

4. The computer-implemented method of claim 1, wherein the mean of the first mean vector further includes one or more vectors for parent concepts of the concept.

5. The computer-implemented method of claim 4, further comprising:
    identifying one or more non-ambiguous text representations of a concept; and wherein the output of the loss function is further proportional to a second cosine similarity between the vector for the concept and a second mean vector, wherein the second mean vector is a mean of one or more word vectors based on the one or more non-ambiguous text representations.

6. The computer-implemented method of claim 5, wherein the one or more non-ambiguous text representations are identified in one or more lexical corpora.

7. The computer-implemented method of claim 5, further comprising:
    identifying, using the vector space model, one or more words that are related to a queried concept based on a cosine similarity of word vectors of the one or more words to a concept vector of the queried concept.

8. The computer-implemented method of claim 5, further comprising:
    identifying, using the vector space model, one or more concepts that are related to a queried word based on a cosine similarity of concept vectors of the one or more concepts to a word vector of the queried word.

9. A computer system for natural language processing, the computer system comprising:
    one or more computer processors;
    one or more computer readable storage media;
    program instructions stored on the one or more computer readable storage media for execution by at least one of the one or more computer processors, the program instructions comprising instructions to:
    extract one or more training examples for one or more concepts of a hierarchical ontology, wherein the one or more training examples for the one or more concepts are based on neighboring concepts in the hierarchical ontology;
    initialize a plurality of vectors each including one or more features, wherein each vector corresponds to a concept of the one or more concepts;
    generate a vector space model by iteratively modifying one or more vectors of the plurality of vectors to optimize a loss function, wherein an output of the loss function for each concept is proportional to a first cosine similarity of a vector for the concept and a first mean vector, wherein the first mean vector is a mean of a plurality of vectors for child concepts of the concept; and
    perform natural language processing using the vector space model.

10. The computer system of claim 9, wherein the vector space model comprises a continuous bag of words model.

11. The computer system of claim 9, wherein the one or more training examples for the one or more concepts include one or more positive training examples and one or more negative training examples, and wherein the program instructions to optimize the loss function comprise instructions to:
    modify one or more vectors of the plurality of vectors to minimize the loss function for each of the one or more positive training examples; and
    modify one or more vectors of the plurality of vectors to maximize the loss function for each of the one or more negative training examples.

12. The computer system of claim 9, wherein the mean of the first mean vector further includes one or more vectors for parent concepts of the concept.

13. The computer system of claim 12, wherein the program instructions further comprise instructions to:
    identify one or more non-ambiguous text representations of a concept; and wherein the output of the loss function is further proportional to a second cosine similarity between the vector for the concept and a second mean vector, wherein the second mean vector is a mean of one or more word vectors based on the one or more non-ambiguous text representations.

14. The computer system of claim 13, wherein the one or more non-ambiguous text representations are identified in one or more lexical corpora.

15. The computer system of claim 13, wherein the program instructions further comprise instructions to:
identify, using the vector space model, one or more words that are related to a queried concept based on a cosine similarity of word vectors of the one or more words to a concept vector of the queried concept.

16. The computer system of claim 13, wherein the program instructions further comprise instructions to:
identify, using the vector space model, one or more concepts that are related to a queried word based on a cosine similarity of concept vectors of the one or more concepts to a word vector of the queried word.

17. A computer program product for natural language processing, the computer program product comprising one or more computer readable storage media collectively having program instructions embodied therewith, the program instructions executable by a computer to cause the computer to:
extract one or more training examples for one or more concepts of a hierarchical ontology, wherein the one or more training examples for the one or more concepts are based on neighboring concepts in the hierarchical ontology;
initialize a plurality of vectors each including one or more features, wherein each vector corresponds to a concept of the one or more concepts;
generate a vector space model by iteratively modifying one or more vectors of the plurality of vectors to optimize a loss function, wherein an output of the loss function for each concept is proportional to a first cosine similarity of a vector for the concept and a first mean vector, wherein the first mean vector is a mean of a plurality of vectors for child concepts of the concept; and
perform natural language processing using the vector space model.

18. The computer program product of claim 17, wherein the vector space model comprises a continuous bag of words model.

19. The computer program product of claim 17, wherein the one or more training examples for the one or more concepts include one or more positive training examples and one or more negative training examples, and wherein the program instructions to optimize the loss function cause the computer to:
modify one or more vectors of the plurality of vectors to minimize the loss function for each of the one or more positive training examples; and
modify one or more vectors of the plurality of vectors to maximize the loss function for each of the one or more negative training examples.

20. The computer program product of claim 17, wherein the mean of the first mean vector further includes one or more vectors for parent concepts of the concept.

21. The computer program product of claim 20, wherein the program instructions further cause the computer to:
identify one or more non-ambiguous text representations of a concept; and wherein the output of the loss function is further proportional to a second cosine similarity between the vector for the concept and a second mean vector, wherein the second mean vector is a mean of one or more word vectors based on the one or more non-ambiguous text representations.

22. The computer program product of claim 21, wherein the one or more non-ambiguous text representations are identified in one or more lexical corpora.

23. The computer program product of claim 21, wherein the program instructions further cause the computer to: identify, using the vector space model, one or more words that are related to a queried concept based on a cosine similarity of word vectors of the one or more words to a concept vector of the queried concept.

24. The computer program product of claim 21, wherein the program instructions further cause the computer to identify, using the vector space model, one or more concepts that are related to a queried word based on a cosine similarity of concept vectors of the one or more concepts to a word vector of the queried word.

* * * * *